US011089081B1

(12) United States Patent
Karppanen

(10) Patent No.: US 11,089,081 B1
(45) Date of Patent: Aug. 10, 2021

(54) INTER-PROCESS RENDERING PIPELINE FOR SHARED PROCESS REMOTE WEB CONTENT RENDERING

(71) Applicant: Amazon Technologies, Inc., Seattle, WA (US)

(72) Inventor: Jari Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 264 days.

(21) Appl. No.: 16/143,310

(22) Filed: Sep. 26, 2018

(51) Int. Cl.
| G06F 9/44 | (2018.01) |
| H04L 29/08 | (2006.01) |
| H04L 29/06 | (2006.01) |
| H04L 9/32 | (2006.01) |
| G06F 9/54 | (2006.01) |

(52) U.S. Cl.
CPC .............. H04L 67/02 (2013.01); G06F 9/547 (2013.01); H04L 9/3213 (2013.01); H04L 63/08 (2013.01); H04L 67/146 (2013.01); H04L 67/42 (2013.01)

(58) Field of Classification Search
CPC ...................................................... H04L 67/02
USPC ........................................................ 719/313
See application file for complete search history.

(56) References Cited

U.S. PATENT DOCUMENTS

| 7,626,588 B1 * | 12/2009 | Molnar | G06F 12/0802 345/557 |
| 2011/0304634 A1 * | 12/2011 | Urbach | G06F 9/5016 345/501 |
| 2019/0342380 A1 * | 11/2019 | Thota | G06F 16/184 |

OTHER PUBLICATIONS

"Information technology—Trusted Platform Module—Part 1: Overview," International Organization for Standardization/International Electrotechnical Commission ISO/IEC 11889-1:2009(E), May 15, 2009, 20 pages.
"Information technology—Trusted Platform Module—Part 2: Design principles," International Organization for Standardization/International Electrotechnical Commission ISO/IEC 11889-2:2009(E), May 15, 2009, 152 pages.
"Information technology—Trusted Platform Module—Part 3: Structures," International Organization for Standardization/International Electrotechnical Commission ISO/IEC 11889-3:2009(E), May 15, 2009, 204 pages.
"Information technology—Trusted Platform Module—Part 4: Commands," International Organization for Standardization/International Electrotechnical Commission ISO/IEC 11889-4:2009(E), May 15, 2009, 254 pages.

(Continued)

*Primary Examiner* — Timothy A Mudrick
(74) *Attorney, Agent, or Firm* — Davis Wright Tremaine LLP

(57) ABSTRACT

A system, method, and computer readable storage medium for inter-process rendering pipeline for shared process remote web content rendering. The method includes obtaining an image rendering request through an inter-process communication channel established by an application in which the image rendering request including a content area. The method further includes selecting a content rendering engine based on one or more image resources needed to generate web content as specified in the image rendering request, determining the one or more image resources corresponding to the image rendering request by using the content rendering engine, and generating the web content on the content area based at least in part on the one or more image resources.

20 Claims, 9 Drawing Sheets

(56) References Cited

OTHER PUBLICATIONS

"TPM Main: Part 1 Design Principles—Specification Version 1.2—Level 2 Revision 103," Trusted Computing Group, Inc., Jul. 9, 2007, 182 pages.
"TPM Main: Part 2 TPM Structures—Specification Version 1.2—Level 2 Revision 103," Trusted Computing Group, Inc., Jul. 9, 2007, 198 pages.
"TPM Main: Part 3 Commands—Specification Version 1.2—Level 2 Revision 103," Trusted Computing Group, Inc., Jul. 9, 2007, 330 pages.
"TPM Main: Part 1 Design Principles—Specification Version 1.21—Revision 116," Trusted Computing Group, Inc., Mar. 1, 2011, 184 pages.
"TPM Main: Part 2 TPM Structures—Specification Version 1.2—Revision 116," Trusted Computing Group, Inc., Mar. 1, 2011, 201 pages.
"TPM Main: Part 3 Commands—Specification Version 1.2—Revision 116," Trusted Computing Group, Inc., Mar. 1, 2011, 339 pages.

* cited by examiner

INTER-PROCESS RENDERING PIPELINE FOR SHARED PROCESS REMOTE WEB CONTENT RENDERING

BACKGROUND

Browsers are used to access web content or locally stored content. The location of such content is often identified by a location address such as a uniform resource locator (URL). A browser may use a URL to access content associated with the URL. A user can interact with a browser through a user-interface to direct a browser to different content areas.

To directly display web content rather than using a browser application, a client application on a device may instantiate its dedicated rendering engine which is a copy of the rendering engine running in the browser application. When multiple applications attempt to render web content, however, multiple copies of the same rendering engine code may be required to be used. Further, the device may also run web browser applications on top of client applications, which would also need copies of their own dedicated rendering engines. Although these rendering engines share the same binary code (memory pages), the rendering engine is instantiated for each requesting application to maintain separate rendering processes.

BRIEF DESCRIPTION OF THE DRAWINGS

Various techniques will be described with reference to the drawings, in which.

DETAILED DESCRIPTION

Figure 1:
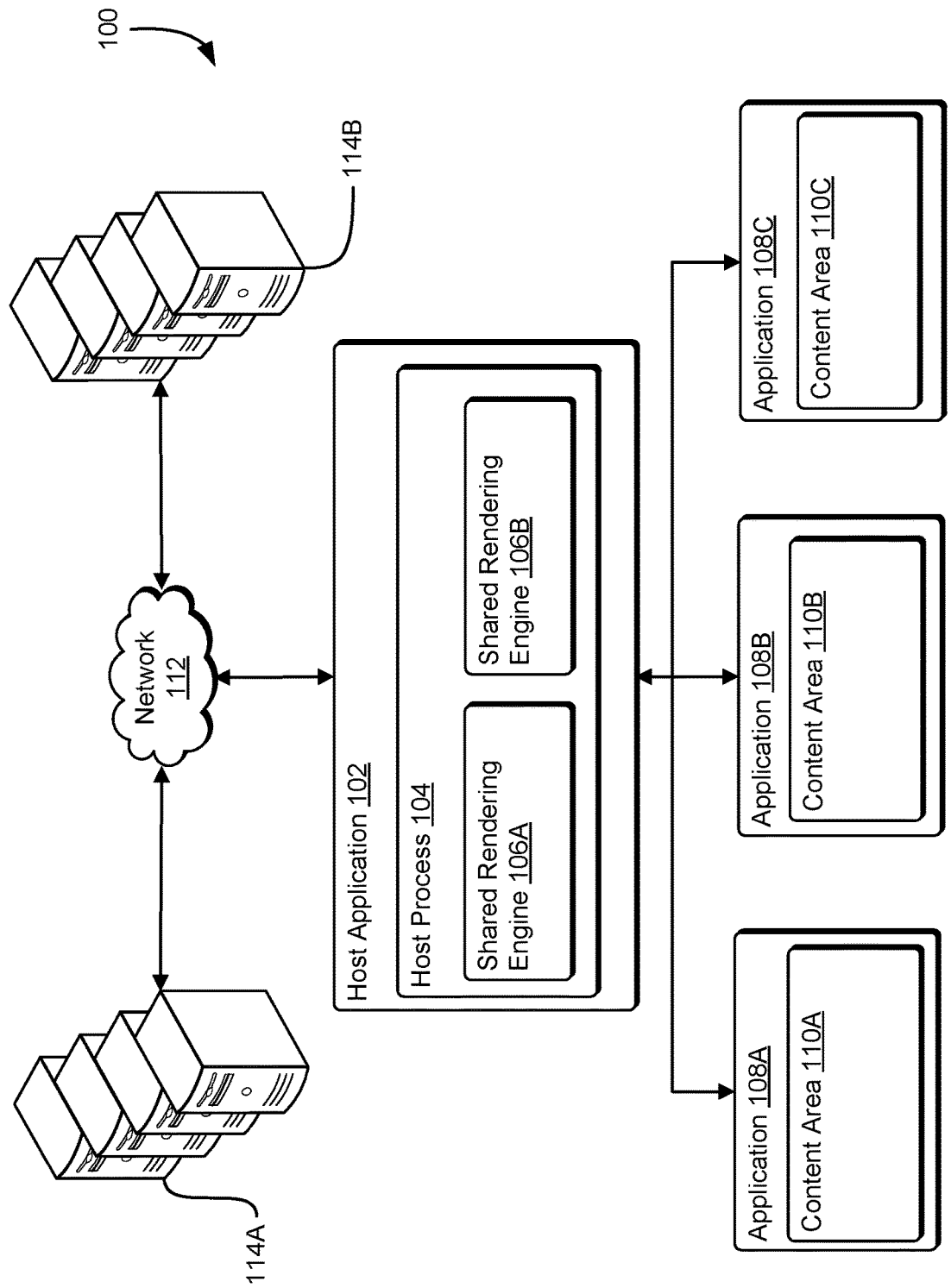
FIG. 1 illustrates a network environment for inter-process rendering pipeline for shared process remote web content rendering in accordance with an embodiment.

Techniques described and suggested herein include systems, methods, and processes for inter-process rendering pipeline for shared process remote web content rendering in accordance with an embodiment. In several aspects of the present disclosure, a host application such as a web browser may incorporate a shared rendering engine, where a single remote master process will control a number of partially sandboxed rendering engines to render web content requested by a number of client applications. To generate web content, a client application may establish a persistent communication inter-process channel to a master process of the host application and provides information associated with a content area for output, in which the information may include a texture or a virtual screen. For some implementations, the information can indicate a smaller clipping region of the larger content area.

After receiving the request and the information associated with the content area, the host process and/or software components thereof may control scheduling of an inter-process worker thread pool (each sandboxed rendering process has a number of worker threads, including shared workers in the host process) that generate drawing instructions and image resources for compositing the final content by combining output from multiple sources. Once the final web content is generated by the host process, the host application provides the instructions and the image resources to the client application so that the host application can generate the requested content on behalf of the client application by using the obtained instructions and the image resources.

In several aspects of the present disclosure, memory resources for the entire group of rendering processes are reserved from a single pool. The scheduling of rendering process can be based on the size of the pool and the memory resources available therein, so as to avoid several rendering processes causing a bottleneck on the device. In addition, each rendering process and associated threads are associated with authentication credentials and image resource identifiers, which allow the host process to access resources to generate web content on behalf of the client application.

In additional embodiments of the present disclosure, operating system of a device may provide operational states of the client applications to the host application. Based on the operational state of a client application, the host application may determine the schedule for executing the corresponding rendering process. For example, the host application may prioritize rendering web content for client application at the foreground, to avoid resource starvation and/or priority inversion by processing rendering processes for all foreground and background applications. In some aspects, the client application can provide the host application with information indicative of user activity and/or power saving state policy, either of which may be associated with the client application itself or the device executing such client application. In response, the host application may cause the host process to adjust or suspend the shared rendering engine to conserve power in accordance with the provided policy when user is inactive. By causing the host application to adjust its rendering operations in accordance with the user activity and power states associated with the client application and/or device, the host application may achieve compatibility with any application and device policies, including compliance of deeper power saving states of mobile devices that involve temporarily deactivating CPU cores and disabling one or more features available to the client application.

In some aspects of the present disclosure, the host application may provide feedback (e.g., notification, callback) to the client application when the host application is unable to perform the rendering process as expected, to allow the client application to adjust its behavior based on such feedback. For example, a rendering request submitted by the client application may include a deadline before which the rendering process must be completed. If the current rendering process load causes the host application to be unable to perform the request by the deadline, the host application may provide a notification to the client application indicating the request cannot be performed as specified. In some aspects, the client application may submit a subsequent request with adjusted parameters including an updated deadline.

In other aspects of the present disclosure, an application programming interface ("API") may be provided by the host application to enable client application to use other features associated with remote web content rendering. For example, the API may include a deadline as to when the web content needs to be rendered or updated, performance metrics of the device and corresponding user interface that run the client application, and clipping region information to avoid the host application from rendering content that would be obscured (to allow non-rectangular output). In several aspects, API call uses request/response semantics which may be synchronous or asynchronous process. In some embodiments, API method will allow the client application to set up shared memory block with negotiated fields to track performance metrics of rendering web content, including the use of counters and histograms.

In some aspects of the present disclosure, the host application may detach the inter-process communication channel after receiving a reconnection token (or interchangeable referred to as "handle"). The host process will sustain the state or optionally marshal the state to persistent storage, allowing the client application to perform offline operations, including upgrade itself, temporarily terminate itself to conserve resources, or restart itself with different user interface. In turn, the client application can reconnect with the existing web content using the reconnection token, without losing user state such as form input, dynamically loaded content, and session cookies.

In some aspects of the present disclosure, the inter-process rendering pipeline for shared process remote web content rendering can also be used for headless browsing. In other aspects of the present disclosure, service provider enabled browser applications, in which a single master instance instantiated by a service provider renders content for multiple client applications without the overhead from the client applications from running copies of multiple separate rendering engine processes on the devices.

As one skilled in the art will appreciate in light of this disclosure, certain embodiments may be capable of achieving certain advantages, including efficient management of computing resources required to generate web content for applications in device(s). By avoiding in creation of multiple copies of rendering engines for each client application, aspects of the present disclosure allow devices to generate web content with significantly reduced risk of memory leaks, resource starvation, and priority inversions, all of which can be a typically problem for conventional graphic rendering technology. Further, aspects of the present disclosure provide a system for secure inter-process communication between applications, by use of authentication credentials that allow rendering processes having similar credentials can share image resources to generate web content.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a network environment 100 for inter-process rendering pipeline for shared process remote web content rendering in accordance with an embodiment. The network environment 100 may include host application 102 which may be web browser (e.g., Microsoft Windows Internet Explorer, Mozilla Firefox, Apple Safari, Google Chrome, and Opera, etc.) that is configured to communicate with one or more remote servers 114A-B through network 112 to fetch web content and display those web content. Host application 102 may be implemented on any device that can render web content. Such a device may include, but is not limited to, a device having a processor and memory for executing and storing instructions. Such a device may include software, firmware, and hardware. Software may include one or more applications and an operating system. Hardware can include, but is not limited to, a processor, memory and user interface display. Optional input devices, such as a mouse a touch sensitive screen, or any future developed interaction method may be used.

Host application 102 may contact one or more remote servers 114A-B on behalf of client applications 108A-C and download data to display. In some embodiments, the data may be represented as hypertext markup language, dynamic hypertext markup language, extendable markup language, image data, video or sound. In another example, host application 102 may download and execute scripts according to the AJAX (Asynchronous JavaScript and XML) framework. The AJAX framework asynchronously transmits and receives data from a server to update a content area without reloading the content area.

Host application 102 includes a host process 104 coupled to one or a plurality of shared rendering engines 106A-N through inter-process communication. Host process 104 can communicate with one or more web servers (such as web server 906 of FIG. 9) over one or more networks 112, such as the Internet. In several embodiments, host process 104 can further communicate with an input of client applications 108A-C to allow a user to input data, to input commands, or to provide other control information to host process 104. Shared rendering engines 106A-N can render data for display at a client device running host process 104.

In one embodiment, the host process 104, via the shared rendering engine, renders web content for the host application 102. In addition to generating host application content, the host process 104 manages remote web content rendering requests from other applications in the same device or other devices, including client applications 108A-C. For example, the host process 104 obtains a request from client application 108A of the computing device to render its web content. Thereafter, host process 104 selects shared rendering engine 106A or 106B to generate instructions and resources for rendering content on the content area. In several embodiments, host process 104 schedules when shared rendering engines 106A-B should generate web content for the application 108A. As used herein, the term content area used herein refers to an area of a user interface display that can display content addressed by an URL. As an illustrative example, the content displayed in the content area may include, for example, a web page, application, document, video, multimedia content, future utilized content mechanism, or any combination thereof. These examples are illustrative and are not intended to limit the definition.

Host process 104 and shared rendering engines 106A-N may communicate with client applications 108A-C through inter-process communication. In an embodiment, inter-process communication may include an inter-process communication method such as a named pipe. A named pipe is a form of inter process communication known to those of skill in the art. A named pipe may allow two processes to communicate with each other. Named pipes may allow inter process communication without introducing additional threads. Furthermore, named pipes may allow users to have control over the construction of a named pipe. Control over construction of a named pipe may allow the user to impose security restrictions on communication over the named pipe and control overall performance of a named pipe.

Inter-process communication may communicate messages as contiguous arrays of bytes. Contiguous arrays of bytes may be communicated serially. Each message that is transmitted may be prefixed with a header structure. A header structure may define a message type, length of data contained in the message, and a routing identifier. The routing identifier may be used to specify a destination for a message within a receiving process. Messages may be communicated between different components of host application 102, for example, during instantiations of content areas or interaction with instantiated content areas.

In one embodiment, inter-process communication may be used for exchanging requests and subsequent messages between the client applications 108A-C and the host application 102, while the content area or associated drawing instructions are transmitted through another communication channels such as TCP or UCP. Because the inter-process communication already established a secure channel of exchanging configurations and other types of data between the host application 102 and the client applications 108A-C, the step of providing the instructions to generate the web content can be provided on a channel different from the inter-process communication. In other embodiments, a second inter-process communication may be established between the host application 102 and the client applications 108A-C, so that the first inter-process communication may be dedicated to exchange requests and messages between the client applications 108A-C and the host application 102 whereas the second inter-process communication may be dedicate to exchange the output from the rendering process of the host process 104 (e.g., rendered content area, drawing instructions) and the client applications 108A-C.

In several embodiments, client applications 108A-C provide information associated with one or more content areas 110A-C to the host application 102 for remote content rendering. In one embodiment, host application 102 obtains information associated with content areas 110A-C such as screen size, screen resolution, computing resource capacity of the device(s) displaying the content areas, one or more clipping regions of the content areas for which rendering content is requested, and the like. In some embodiments, the information associated with the one or more content areas 110A-C may include a remote texture or a virtual screen which allows the rendering processes to generate rendered content into such virtual screen and communicate the rendering information of the virtual screen back to the client applications 108A-C. In another embodiment, the client application 108A submits a request with the content area 110A to the host application 102, which in turn generates content in the content area and provide the rendered content area to client applications 108A-C.

In response to executing the rendering process generated to render content on behalf of the client application, the host process 104 generates content for the content areas 110A-C using one or more image resources obtained from servers 114A and/or 114B. In one embodiment, the host application may provide access of the rendering process and the generated content to the client applications 108A-C so that client applications 108A-C may remotely display the content in on their corresponding content areas 110A-C. In some embodiments, the host process 104 accesses the content areas 110A-C and generates the content on behalf of the client applications 108A-C. In both above embodiments, the host application 102 and client applications 108A-C may obtain tokens or resources to permit the other to access the rendering process and content areas 110A-C to display the generated content. In another embodiment, the host process 104 provides one or more programmable instructions to the client applications 108A-C, which the client applications 108A-C may use those drawing instructions (and one or more image resources) to render content on the device. In yet another embodiment, the client application 108A may receive a rendered content area from the host application 102, in which all the programming libraries and other dependencies are not required to be loaded in the client application 108A.

Client applications 108 A-C may display web content that are typically handled by rendering process of a web browser, which allows a user to access and view such web content on the graphic user interface of the client applications 108A-C. In particular implementations, the client applications 108A-C generate a request for remote web content rendering and may include network addresses of servers 114 A-B that provides one or more image resources for generating the remote web content. In some embodiments, network addresses include Uniform Resource Locators (URLs), which address content stored across one or more networks, such as the Internet. In another example, a URL may be a path corresponding to a location of a locally stored file. These examples are illustrative and are not intended to limit the definition.

As referred to herein, image resources may be any hardware, software, memory resources, and/or data objects configured to enable placement of image content in content area, such as content areas 110A-C. In some embodiments, image resources may include video image resources for rendering video image content on content areas 110A-C. In other embodiments, image resources may include still image resources for rendering still image content on content areas 110A-C. Examples of image resources include, but are not limited to, fonts, decoded (cached) images, image decoder binary libraries, and rasterized content. In one embodiment, each of the content areas 110A-C may render different content. In other embodiments, all content areas 110A-C may be the same (e.g., splash screen of a third-party application) which allows the host process to allow the content areas to share the rendered web content with each other.

Figure 9:
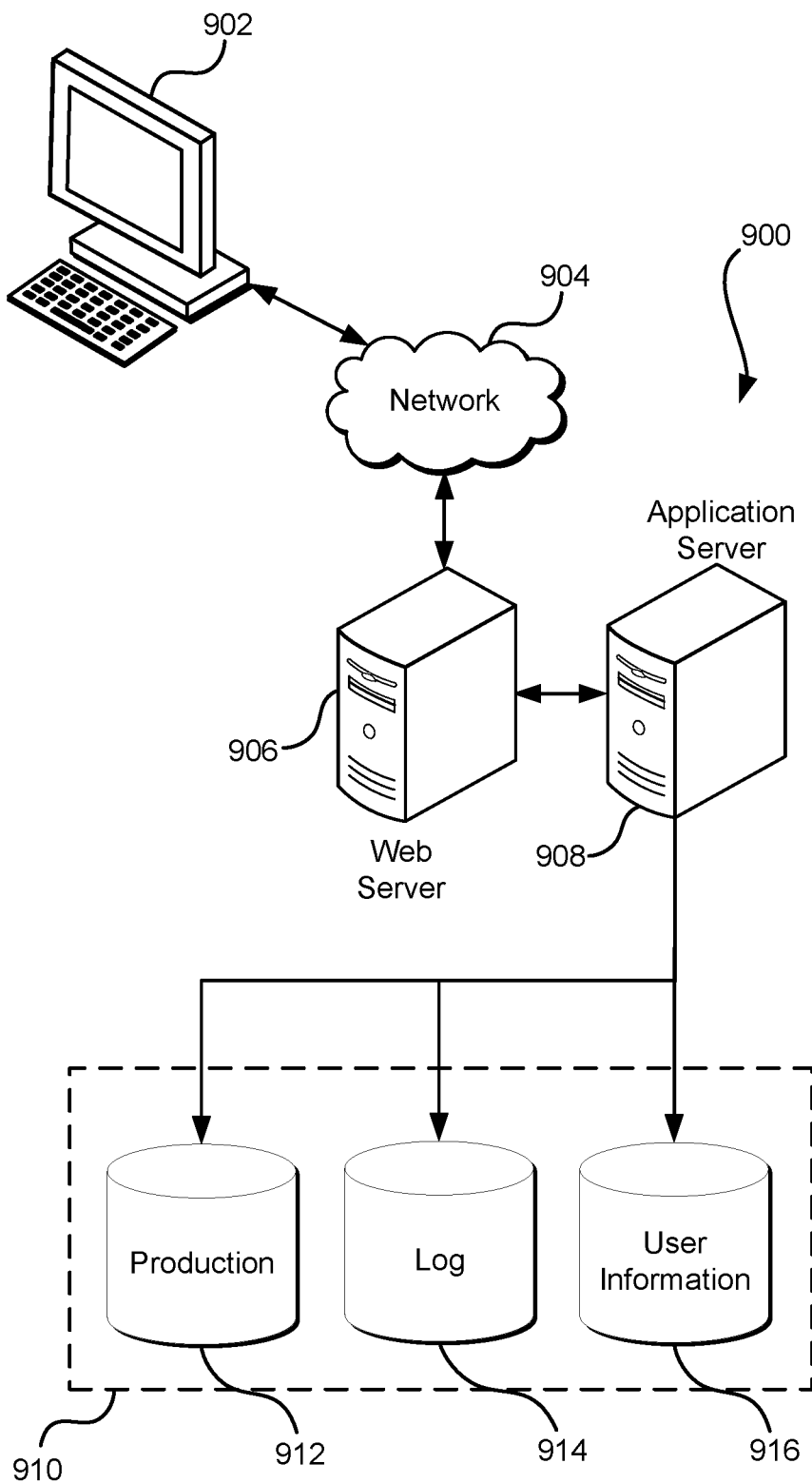
FIG. 9 illustrates a system in which various embodiments can be implemented.

Client applications 108A-C may be implemented on one or more electronic client devices, such as an electronic client device 902 of FIG. 9, which includes any appropriate device operable to send and/or receive requests, messages, or information over an appropriate network 112 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In some embodiments, client applications 108A-C are executed on the same device that executes the host application 102. In another embodiment, client applications 108A-C are executed on a different device from the host application 102.

Network 112, such as network 904 of FIG. 9, may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN).

Figure 2:
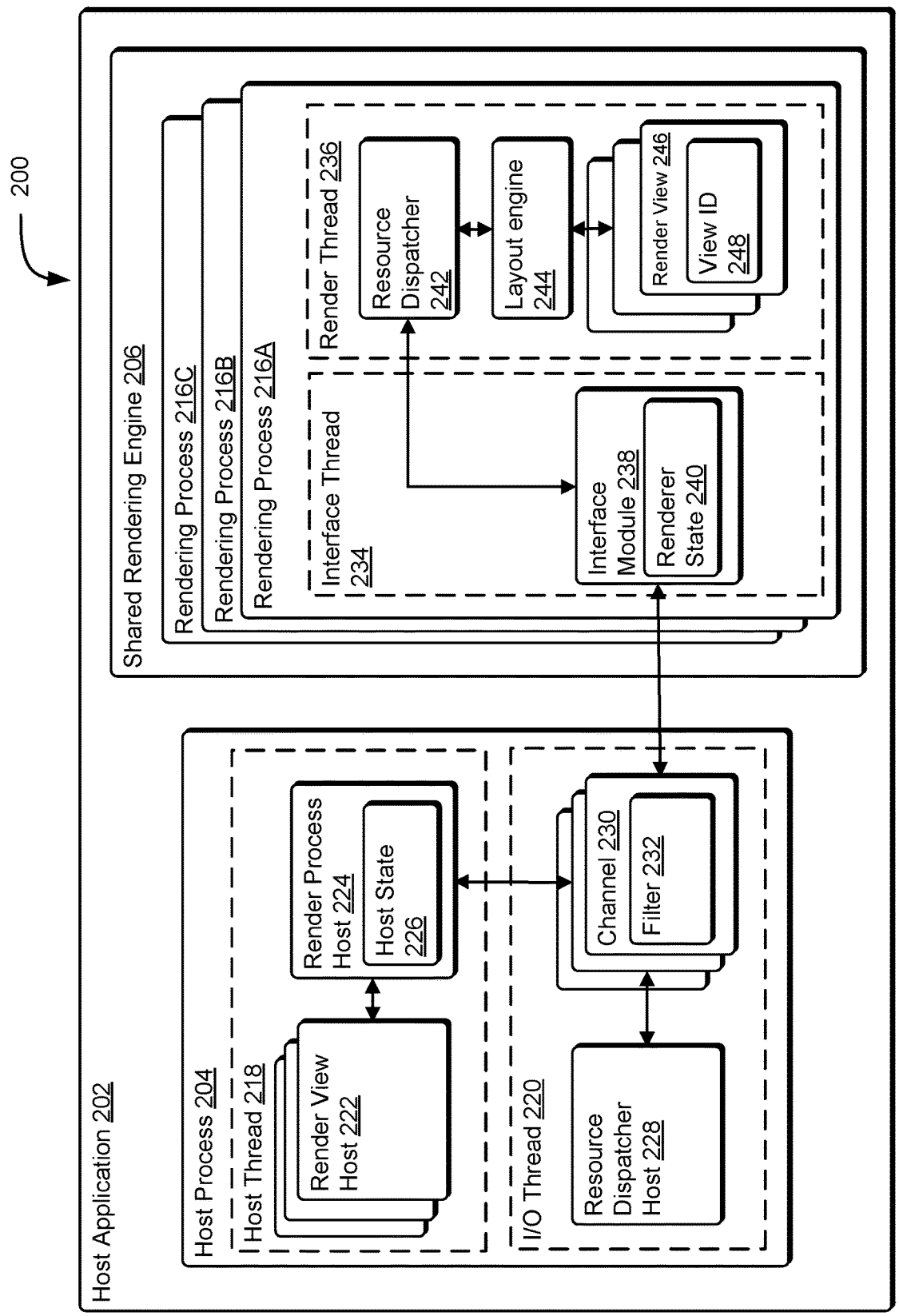
FIG. 2 illustrates a block diagram of a host application architecture for inter-process rendering pipeline for shared process remote web content rendering in accordance with an embodiment.

FIG. 2 illustrates a block diagram of a host application architecture 200 for inter-process rendering pipeline for shared process remote web content rendering in accordance with an embodiment. The architecture 200 includes the host application 202, which in turn includes the host process 204 and shared rendering engine 206. In one embodiment, the host process 204 may further include a render view host 222, a render process host 224, a resource dispatcher host 228 and a channel 230. Channel 230 may further comprise a filter 232. Render process host 224 further comprises a host state 226.

Host thread 218 may include render view host 222 and render process host 224. As referred herein, the term thread used refers a sequence of executing instructions that can run independently of other threads yet can directly share data with other threads. In one embodiment, render view host 222 manages a render view 246 generated by rendering process 216. To manage the render view 246, render view host 222 may communicate a message through a corresponding render process host 224. Render process host 224 may communicate this message to rendering process 216 using the inter-process communication. Once the message is received, rendering process 216 may then communicate the same message to a corresponding render view 246 in a shared rendering engine 206A. Such messages may need to be communicated during interaction with information associated with content areas received from the client application (e.g., client application 108 of FIG. 1). In this way, render view host 222 may communicate with and manage a render view 246. In some embodiments, a plurality of render view host(s) 222 may manage a plurality or render view(s) 246.

Render process host 224 may exist for each of a plurality of shared rendering engines 206A-N. Render process host 224 may manage a host state 226 and communication with the shared rendering engine 206A. A render process host 224 corresponding to each render view 246 maintains a render view host 222 in the host thread 218. In several embodiments, host state 226 may be maintained by host process 204. Host state 226 may include session information of shared rendering engine 206A. If a shared rendering engine 206A experiences a fault in its operation or needs to terminate, host process 204 may be able to recreate the faulted shared rendering engine 206A and restore its session information stored in host state 226. Host state 226 may include session cookies or session information that have been provided by the request submitted by the client application. For example, a session information may be used by a web server (such as web server 906 in FIG. 9) to differentiate client applications that submitted information associated content areas to the host application 202 and to maintain data related to the client application (e.g., account). Session information may include a list of previously visited sources from which one or more image resources were retrieved and their respective state rendered by shared rendering engine 206A. In some embodiments, the session information for a content area rendered by shared rendering engine 206A may include a single or a plurality of user values. Additionally session information may store the scroll position of a content area provided by the client application.

In several embodiments, Input/Output (I/O) thread 220 of the host process 204 may include resource dispatcher host 228 and channel 230. Channel 230 may further include filter 232. In some embodiments, I/O (Input/Output) thread 220 may be used by host process 204 to communicate with shared rendering engine 206A. The I/O thread 220 in association with the host thread 218 may communicate messages from host process 204 to one or a plurality of render view(s) 246. Resource requests for image resources corresponding to a content area may be communicated by I/O thread 220. In several embodiments, one or more image resources needed by the rendering process 216 is provided to resource dispatcher host 228 through the I/O thread 220. The resource dispatcher host 228, using authentication credentials provided in the request submitted by the client application, communicates with one or more servers to retrieve the image resources to enable the client application to render the content area.

Inter-process communication channel 230 may communicate messages to the host thread 218. In one embodiment, inter-process communication channel 230 may reside in I/O thread 220. Channel 230 may act as a proxy between render view(s) 246 and the host thread 218. Channel proxy may communicate messages between channel 230 and render process host 224. In one embodiment, filter 232 which may reside in inter-process communication channel 230, may be constructed in the channel by render process host 224. Filter 232 may intercept resource request messages from shared rendering engines 206A-N and may forward them directly to the resource dispatcher host 228. In some embodiments, inter-process communication channel 230 may be provisioned for each rendering process 216 in the shared rendering engine 206. In this manner, resource requests for rendering a content area may be handled by I/O thread 220 and this may reduce the amount of resource handling needed to be done by the host thread 218.

In several embodiments, interface thread 234 may include interface module 238. Interface module 238 may further include a renderer state 240. Interface module 238 may be included in each of renderer processes 120A-N. Interface module 238 may manage communication with host process 204 and may also maintain a renderer state 240. Each interface module 238 may communicate with one or plurality of render view(s) 246 which correspond to the content area provided by the client application. In one embodiment, renderer state 240 may maintain information relating to the state of a corresponding shared rendering process 216. Renderer state 240 may include information on if the corresponding shared rendering process 216 has become unresponsive or if it is requesting system resources.

Render thread 236 may include resource dispatcher 242, layout engine 244 and render view 246. In several embodiments, render view 246 may correspond to one or more content areas and/or information associated with the one or more content areas (e.g., virtual screen) provided by the client application. For example, not intended to limit the invention, host application may instantiate a new shared rendering engine 206A in response to obtaining request submitted by the client application, and the shared rendering engine generates rendering process 216 that creates a render view 246 for the requested content area. As an example, not intended to limit the invention, a content area may be a navigation browser screen within a client application. In another embodiment, render view 246 may include a Hyper Text Markup Language (HTML) parser and a JavaScript interpreter. An HTML parser is known to a person of skill in the art and may be used to identify HTML mark-up tags to render content appropriately. A JavaScript interpreter may be used to identify JavaScript that may be a part of content.

Render view 246 may be managed by interface module 238. Each render view 246 is identified by a view ID 248. View ID (View Identifier) 248 may be used to identify different instances of render view 246 in a particular renderer process 120A-N. View ID(s) 248 may be unique in an instance of renderer process 120A-N. In order to identify a render view 246 from a host process 204, the host process 204 may require the rendering process 216 to provide an interface host in addition to a view ID 248. Communication from host process 204 to a specific content area may be accomplished through render inter-process communication.

In several embodiments, resource dispatcher 242 may be included render thread 236. Resource dispatcher 242 may communicate with layout engine 244. Resource dispatcher 242 may generate resource requests for one or more image resources which are communicated to the resource dispatcher host 228 of I/O thread 220. In some embodiments, the render thread 236 may include a layout engine 244 for the rendering process 216. Layout engine 244 may store and manage content in a content area of host process 204 in the form of a data structure. In some embodiments, Repair thread (not shown) may be included in each shared rendering engine 206A. Repair thread may detect a faulty shared rendering engine 206A and may terminate the corresponding shared rendering engine 206A. In one embodiment, host process 204 may send a message to repair thread in response to a content area in which the rendering web content may be un-responsive. Such a message may allow the repair thread to take remedial actions, such as terminating and instantiating a new shared rendering engine 206A.

In several embodiments, any one of the threads (e.g., host thread 218, I/O thread 220) are not limited to the specific operations illustrated herein above. For example, host thread 218 may execute any or all of the operations performed by I/O thread 200, including the use of the inter-process communication channel to provide messages and drawing instructions to the rendering processes 216A-C. In another example, the render thread 236 may also perform one or more operations of the interface thread 234, including obtaining messages from the host process 204 with regards to how the content area should be rendered. In addition, the threads 218, 220, 234, and/or 236 may be provided to an operating system (for example, a multitasking operating system) and may be executed using underling computing resources (for example, independently or concurrently). The computing resources may include computational and memory access resources, among others. For example, an operating system may provide multithreaded execution using an underlying single-core or multi-core central processing unit (CPU) or graphics processing unit (GPU). Further, some CPUs and GPUs may be configured to provide multithreading capability, whereby the architecture of the CPU or GPU may be configured such that two or more of the threads are utilized for processing instructions. Whether underlying processor is single-threaded or multithreaded, an operating system running on the processor may utilize its architecture enable multithreaded execution of the host process 204 and/or rendering processes 216A-C. Optimum utilization of the computing resources may be achieved by ensuring that the computing resources remain fully active during the processing of instructions.

In some embodiments, any one of the rendering processes 216A-N may need to be shared between different content areas, for example, tabs or windows of a client application. This may occur when a parent content area instantiates a new child window (e.g., pop-up windows) in which communication between the two content areas become necessary. This communication may be accomplished with the help of a handle. As an example, not intended to limit the invention, a handle may be an identifier that enables a parent content area to establish communication with a child content area. To render content, a child content area may use the same rendering process of shared rendering engine 206A that rendered the parent content area. For example, when a new child content area may need to be instantiated as a new window, client application may communicate information to the host application 202. Render view host 222 may then instantiate a new render view 246 for the child content area in the same rendering process 216 that renders web content for the parent content area. The render view 246 corresponding to the parent content area may then pass an identifier to a new render view 246 corresponding to the child content area to the render view host 222. This may allow the child content area to use the same rendering process 216 of shared rendering engine 206A that rendered the parent content area.

In other embodiments, any one rendering process 216 of shared rendering engine 206A may be associated with an active content area at a given time. An active content area may refer to any content area that the user is currently interacting with the client application. An example of an active content area may be a foreground application. In an embodiment, not intended to limit the invention, a shared rendering engine 206A that renders a background content area may be treated as a low priority process. A low priority process may get lower priority in the allocation of system resources. Furthermore, a low priority process may be more likely to have its memory swapped out than the foreground rendering process. Memory swapping refers to a method commonly used by persons of skill in the art. As an example, not intended to limit the invention, memory swapping enables an operating system to execute programs and manipulate data files larger than its main memory. The operating system may store as much data as possible into main memory, and leave the rest on a disk. When the operating system needs data from the disk, it may a replace portion of data, commonly referred to in the art as a page or a segment, in main memory with a portion of data on the disk.

Figure 3:
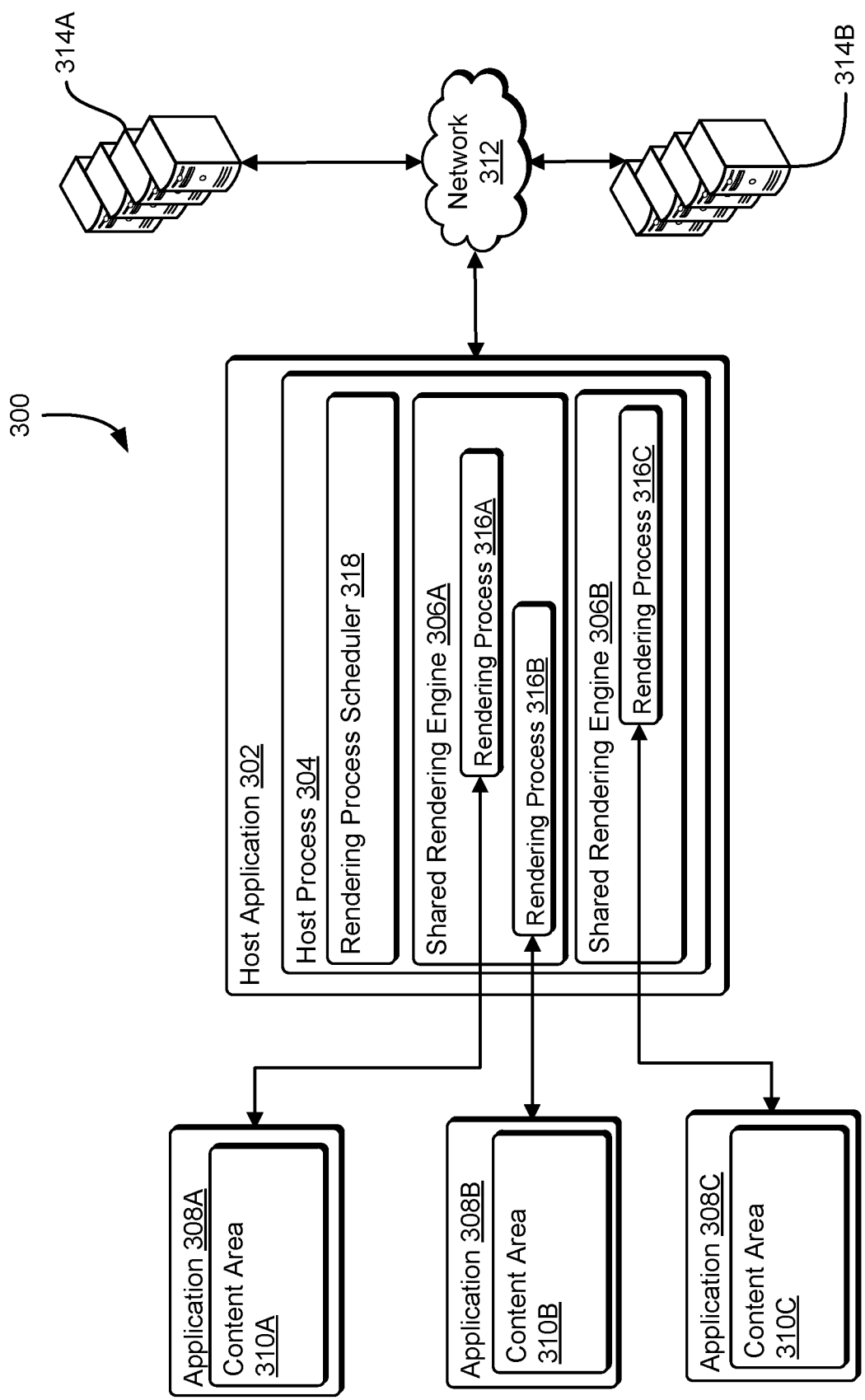
FIG. 3 illustrates a block diagram for rendering remote web content through the use of rendering processes of a host application in accordance with an embodiment.

FIG. 3 illustrates a block diagram 300 for rendering remote web content through the use of rendering processes of a host application in accordance with an embodiment. Client application 308 may be client application 108 of FIG. 1 in accordance with an embodiment. Content area 310 may be content area 110 of FIG. 1 in accordance with an embodiment. Host applications 302 may be host application 102 of FIG. 1 in accordance with an embodiment. Host process 304 may be host process 104 of FIG. 1 in accordance with an embodiment. Shared rendering engines 306A-B may be two of shared rendering engines 106A-N of FIG. 1 in accordance with an embodiment. Network 312 may be network 112 of FIG. 1 in accordance with an embodiment. Servers 314A-B may be servers 114A-B in accordance with an embodiment.

As illustrated above, client applications 308A-N may submit a request to host application 302 to render remote web content on behalf of the client applications 308A-N. In several embodiments, a request from client application 308A may include content area 310A and/or information associated with the content area 310A which may be a virtual screen on which the rendering process 316A produces programmable drawing instructions and one or more image resources for rendering web content, which can be used to generate content on behalf of the client applications 308A-C. In some embodiments, the rendering process 316A generates a plurality of drawing instructions which are used to render web content on the content area 310A. In one embodiment, rendering process 316 generates drawing instructions for drawing fundamental figures such as triangles and tetragons (polygons) and sends those instructions to the rendering engine (such as shared rendering engine 306) rather than directly accesses the frame memory. The shared rendering engine interprets the received drawing instructions and generates an image on the frame memory, including the virtual screen representative of the content areas 310A-C. In addition, each drawing instruction is a sequence of data stream which comprises an opcode (instruction type) and a variable number of parameters, in which the number of parameters depends on the opcode. For example, drawing instructions can be divided into the following categories: (1) management of the rendering server drawing state; (2) management of off screen buffers; (3) pointer control; (4) drawing operations; (5) area blits; and (6) image transfers.

In one embodiment, the request may further include authentication credentials to be processed by the rendering process 316 of the shared rendering engine 306. As referred herein, an authentication credential refers to a collection of information that may be used for authenticating a user and/or gaining access to one or more computing resources. Examples of authentication credentials may include an impersonation credentials, primary access credentials, session credentials, and the like. In one embodiment, the authentication credentials are impersonation credentials, which are a set of fully operable authentication credentials generated by a server (e.g., servers 314A-B) to allow the rendering process 316 to access one or more image resources using a client application user's authorization context such as access rights, privileges and the like. If the request does not include authentication credentials, the rendering process 316 may not communicate with the servers 314A-B through the network 312 to obtain the one or more image resources. Rather, the rendering process 316 may use locally cached resources stored by the host application 302. In additional embodiments, authentication credentials may include an associated processing budget, which can cause the rendering process 316 throttle any scripting engines due to the processor constraint. In some implementations in which trust has been established between the client application and the host application, the client application can directly provide the processor budget.

In one embodiment, authentication credentials of a rendering process 316 may include a tile/region rasterization queue and reference-counter memory resources. As used herein, rasterization refers to the process of obtaining an image described in a vector graphics format (shapes) and converting it into a raster image (pixels or dots). In one embodiment, an image may be divided into several regions of vectors, and the authentication credentials include a queue of regions and/or tiles in which the rasterization sequence should be performed by the rendering process 316.

In other embodiments, the request may further include rendering contexts, which is a data object that includes information required to render a web content. For example, rendering context includes information such as the path to the object to be rendered and any request parameters. In other embodiments, the request may further include a site origin identifier, which indicates the source of one or more image resources that can be communicated and retrieved. In some embodiments, host process 304 may assign rendering processes 316 to one of shared rendering engines 306A-B based on the rendering context in the request. For example, host process 304 assigns rendering process 316A to shared rendering engine 306A for client application 308A, while the host process 304 assigns rendering process 316C to shared rendering engine 306B for client application 308C. In this example, the host process 304 determines that the rendering context submitted by the request from client application 308B is compatible with the rendering context of the request submitted by client application 308A. The host process 304 then assigns rendering process 316B to shared rendering engine 306A, in which the rendering processes share one or more image resources, including fonts, decoded (cached) images, image decoder binary libraries, and rasterized content. In some embodiments, the sharing of image resources by rendering processes 316A-B may include read-only shared memory mapping, while the host process 304 has write access.

Host process 304 obtains the request (and associated authentication credentials and information associated with content area 310) and generates rendering process comprising one or more render threads such as render thread 236 of FIG. 2. In one embodiment, host process 304 controls scheduling of the rendering processes that generate drawing instructions and image resources for compositing the final content by combining output from multiple sources. For example, the host process 304 generates instructions to the shared rendering engine 306A to render web content for rendering process 316B before rendering process 316A. As illustrated above, this may have been caused by the host process 304 prioritizing rendering web content for client application 308B because the client application 308B may be executed on the foreground as opposed to client application 308A which may be running on the background. In this manner, the web content rendering processes may avoid resource starvation and/or priority inversion by processing rendering processes for all foreground and background applications. In some embodiments, operating system of a device running client applications 308A-C may provide operational states of the client applications 308A-C to the host application 302. Based on the operational state of a client applications 308A-C, the host application may determine the schedule for executing the corresponding rendering process.

In some embodiments, the host process 304 may schedule the rendering processes 316A-C based on the size of the pool and the memory resources available therein, so as to avoid several rendering processes causing a bottleneck on the device running the host process 304. In these embodiments, memory resources for the rendering processes 316A-C are reserved from a single pool. Once the final web content is generated by the host process, the host application 302 provides the web content to the client applications 308A-C so that the web content can be displayed on the client applications 308A-C in accordance with the determined schedule.

In other embodiments, the host application 302 may provide feedback (e.g., notification, callback) to the client applications 308A-C if the host application 302 determines that it is unable to perform the rendering process as requested. For example, a rendering request submitted by the client applications 308A-C may include a deadline before which the rendering processes 316A-C must be completed. If the rendering process scheduler 318 indicates that the rendering processes 316A-C cannot be completed as specified by the requests submitted by client applications 308A-C, the host application 302 may generate a notification to the client applications 308A-C indicating the rendering processes 316A-C cannot be completed as requested. In some embodiments, the host application 302 may suspend the rendering processes 316A-C for a period of time after providing the notification, to permit the client applications 308A-C to perform remedial actions.

In one embodiment, the host process 304 includes rendering process scheduler 318. The rendering process scheduler 318 may be a software component that specifies one or more constraints that may be placed on the execution of the rendering processes 316A-C. In some embodiments, the rendering process scheduler may determine the sequence of the execution of the rendering processes 316A-C and corresponding worker threads, or otherwise may generate a queue of rendering processes 316A-C so that each of the rendering processes are executed one after each other. For example, the rendering process scheduler 318 may specify the timing or ordering of the execution of the rendering processes 316A-C. In one embodiment, the host process 304 may communicate with the rendering process scheduler 318 at certain time intervals, to determine whether to execute one or more rendering process 316A-316C based on information provided by the rendering process scheduler 318.

In several embodiments, the rendering process scheduler 318 may determine the order and timing of the execution of the rendering processes 316A-C based on various factors. In one embodiment, the rendering process scheduler 318 determines the schedule of the rendering processes 316A-C based on operational states of each of the corresponding client applications 308A-C. For example, if the client application 308A is converted from a foreground state to a background state, the rendering process scheduler 318 detects the change of the operational state and reconfigures the order and timing of the rendering processes 316A-C accordingly. In one embodiment, the rendering process scheduler 318 may reconfigure the order and timing of the execution for all rendering processes 316A-C based on changes to the operational state of at least one of the client applications 308A-C. In another embodiment, the rendering process scheduler 318 may reconfigure the order and timing for only one of the rendering processes (e.g., rendering process 316A) based on the change of operational state for the corresponding application (e.g., client application 308A).

In some embodiments, the rendering process scheduler 318 determines the schedule of the rendering processes 316A-C based on the computing resources available to the host process 304. For example, computing resources such as CPU, GPU, and/or memory access resources may have processing capacities for executing threads of rendering processes 316A-C at once. If the rendering process scheduler 318 determines that execution of all rendering processes 316A-C at the same time may exceed the processing capabilities of the computing resources allotted to the host process 304. In this case, the rendering process scheduler 318 may reschedule one or more of rendering processes 316A-C so that the computing resources of the host process 304 perform under their maximum capacity. In some embodiments, the capacity of the computing resources can be updated based on other processes or applications on a computing system which also executes the host application 302. In these embodiments, the rendering process scheduler 318 may update the schedule for rendering processes 316A-C because of such changes in the computing resource capacity, even if execution of the rendering processes 316A-C did not exceed the previous maximum capacity of the host process 304.

In some embodiments, the rendering process scheduler 318 determines the schedule of the rendering processes 316A-C based on requests specifically submitted by corresponding applications 308A-C. For example, a client application (e.g., client application 308B) may request the rendering process scheduler 318 to execute the rendering process 316B before other rendering processes based on the client application's urgent request to render the content area. In another example, client application 308C may request the rendering processing scheduler 318 to execute the rendering process 308C after other rendering processes as the rendering process 308C is not urgent and indicated as low priority. In some embodiments, the rendering process scheduler 318 determines the schedule of the rendering processes 316A-C based on deadline indicated by the request of the client applications 308A-C. In other embodiments, the rendering process scheduler 318 may initially schedule the sequence and timing of the rendering processes 316A-C, but based on a subsequent request by the client application, may execute a later rendering process 316C right away.

In another embodiment, the rendering process scheduler 318 may specify conditions for breaking away from the execution of the threads of rendering processes 316A-C, including temporary suspension of operations to any of the rendering processes 316A-C. For example, a condition may be the client application 308A obtaining a reconnection token during which the rendering process scheduler 318 may postpone the rendering process 316A to be executed at a later time, or suspending the execution of the threads of rendering process 316A until the client application 308A reestablishes the connection with the host process 304. The rendering process scheduler 318 may be specific, whereby the rendering process scheduler 318 provides a schedule that may specify the order of execution of the rendering processes 316A-C and the timing of their execution. In other embodiments, the rendering process scheduler 318 may only place general limits on the execution of the rendering processes 316A-C. For example, the rendering process scheduler 318 may specify rules that that the rendering processes 316A-C will be executed at a later time when the host application 302 reaches its maximum CPU and/or GPU capacity.

In some embodiments, the rendering process scheduler 318 may schedule the rendering processes 316A-C based on information indicative of user activity and/or power saving state policy of applications 308A-C. For example, the rendering process scheduler 318 may determine that one or more features of the client application 308C submitting the request may be disabled due to a power policy change of the device executing the client application 308C. In another example, the client application 308C may submit a second request indicating that there is no user activity that is currently interacting with the client application 308C. In response, the rendering process scheduler 318 may cause the host process 304 to adjust or suspend the rendering process 316C in accordance with the state of the client application 308C. By adjusting rendering processes (e.g., rendering process 316C) in accordance with the user activity and power states associated with the client application (e.g., client application 308C) and/or corresponding device, the host application 302 may achieve compatibility with application and device policies, including compliance of deeper power saving states of mobile devices that involve temporarily deactivating CPU cores and disabling one or more features available to the client application.

Figure 4:
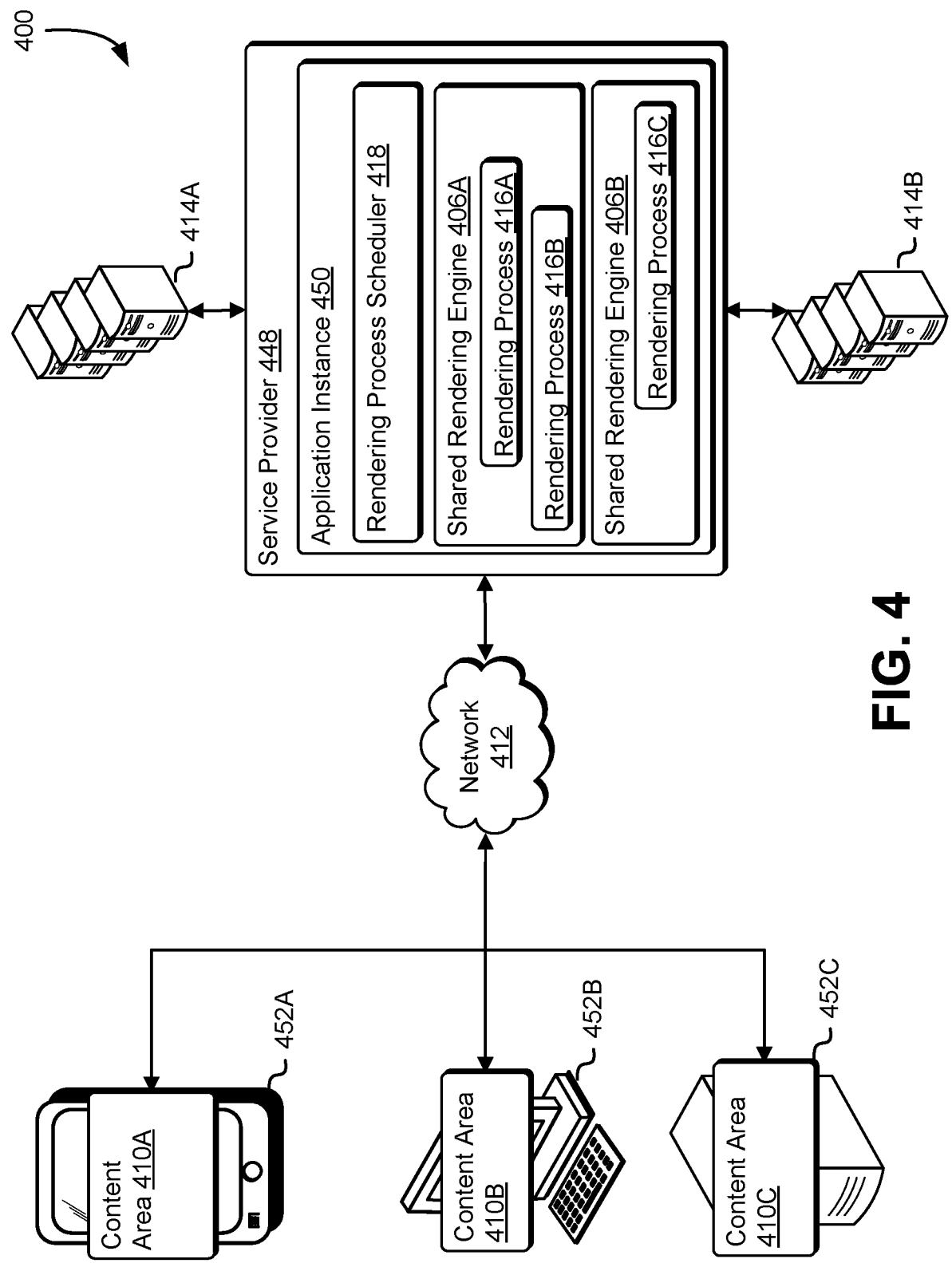
FIG. 4 illustrates a network environment in which inter-process rendering pipeline for shared process remote web content rendering is performed by a computer resource service provider in accordance with an embodiment.

FIG. 4 illustrates a network environment 400 in which inter-process rendering pipeline for shared process remote web content rendering is performed by a computer resource service provider in accordance with an embodiment. Content areas 410A-C may be content areas 310A-C of FIG. 3 in accordance with an embodiment. Network 412 may be network 312 of FIG. 3 in accordance with an embodiment. Shared rendering engines 406A-B may be shared rendering engines 306A-B of FIG. 3 in accordance with an embodiment. Rendering processes 416A-C may be rendering processes 316A-C of FIG. 3 in accordance with an embodiment. Rendering process scheduler 418 may be rendering process scheduler 318 of FIG. 3 in accordance with an embodiment. Servers 414A-B may be servers 314A-B of FIG. 3 in accordance with an embodiment.

In one embodiment, application instance 450 may be instantiated by computer resource service provider 448 to manage rendering processes of content areas 410A-C for devices 452A-C. In this embodiment, each of content areas 410A-C is executed by different devices 452A-C, and the requests for rendering remote web content may be communication to a service provider 448 via network 412. In response to receiving the requests and the content areas, one or more application instance 450, which may include virtual computer resources, may be provisioned to generate rendering processes 416A-C to generate remote web content for content areas 410A-C. In some embodiments, application instance 450 can be one of the plurality of instances (not shown) instantiated by service provider 448 to fulfill the rendering requests submitted by devices 452A-C, in which each application instance such as application instance 450 may be allocated with its own computing resources and one or more dedicated shared rendering engines such as shared rendering engines 406A and 406B. As illustrated above, service provider 448 may assign rendering processes 416A-C to one or more shared rendering engines 406A-B using the rendering process scheduler 418 and manage the schedule as to when the rendering processes 416A-C should be executed.

In some embodiments, an application programming interface ("API") may be used by the client application (such as client application 308A of FIG. 3) of devices 452A-C to submit requests and retrieve rendered web content. Also, the devices 452A-C may use APIs that implement other features associated with remote web content rendering. For example, the API may include a deadline as to when the web content needs to be rendered or updated, performance metrics of the device and corresponding user interface that run the client application, and clipping region information to avoid the service provider 448 from rendering content that would be obscured (to allow non-rectangular output). In several aspects, API call uses request/response semantics which may be synchronous or asynchronous process. In some embodiments, API method will allow the client applications (such as client application 308A of FIG. 3) of devices 452A-C to set up shared memory block with negotiated fields to track performance metrics of rendering web content, including the use of counters and histograms.

In some embodiments, service provider 448 may provide for headless browsing or service provider enabled browser applications to devices 452A-C, in which the application instance 450 provides web content for browsers running in devices 452A-C. These embodiments allow the devices to have their own native host applications which would require consumption of additional computing resources.

Figure 5:
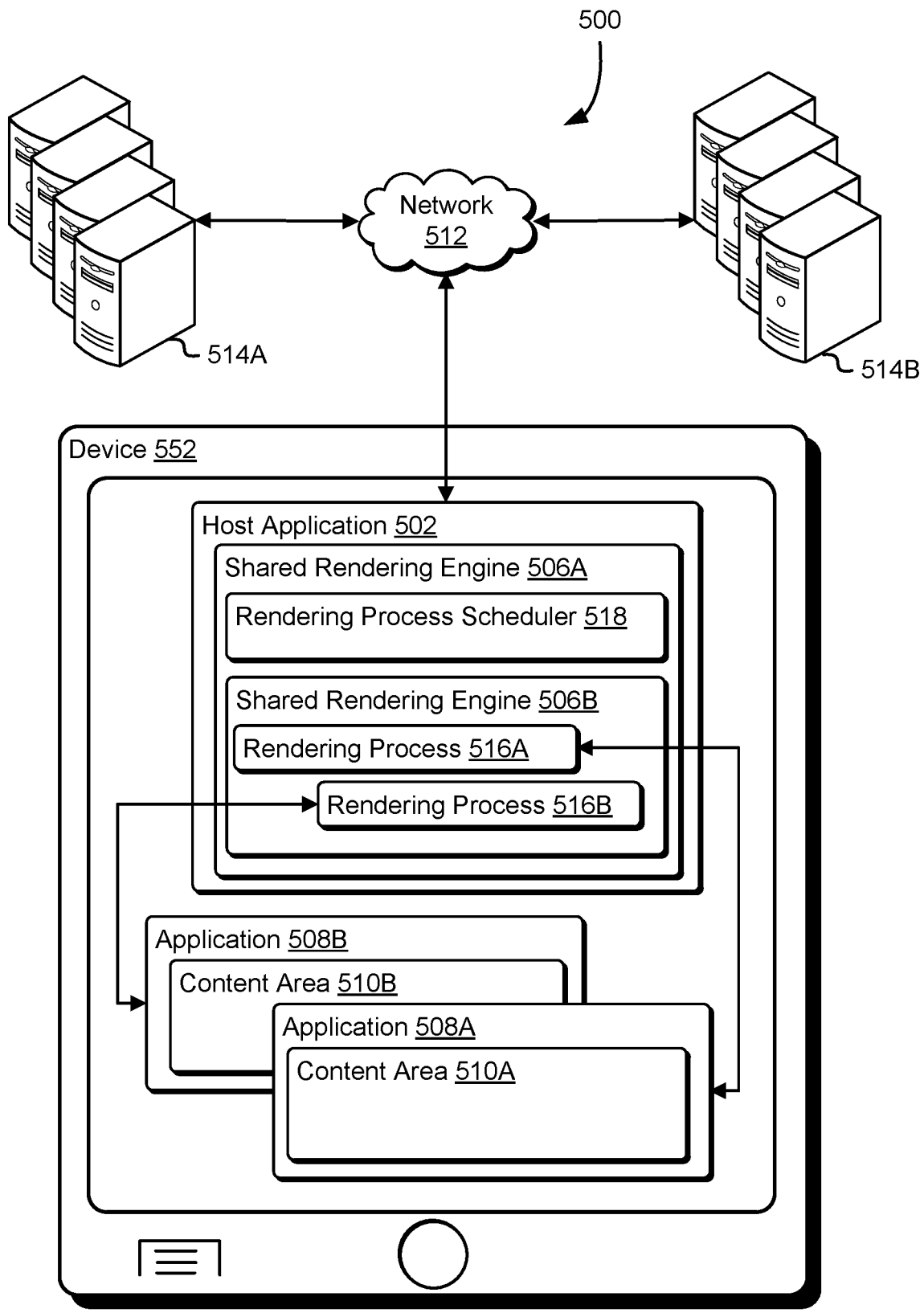
FIG. 5 illustrates a network environment in which inter-process rendering pipeline for shared process remote web content rendering is performed by a computing device in accordance with an embodiment.

FIG. 5 illustrates a network environment 500 in which inter-process rendering pipeline for shared process remote web content rendering is performed by a computing device in accordance with an embodiment. Client applications 508A-B may be client applications 308A-C of FIG. 3 in accordance with an embodiment. Content areas 510A-C may be content areas 310A-C of FIG. 3 in accordance with an embodiment. Host application 502 may be host application 302 of FIG. 3 in accordance with an embodiment. Network 512 may be network 312 of FIG. 3 in accordance with an embodiment. Shared rendering engines 506A-B may be one of shared rendering engines 306A-B of FIG. 3 in accordance with an embodiment. Rendering processes 416A-B may be rendering processes 316A-C of FIG. 3 in accordance with an embodiment. Rendering process scheduler 518 may be rendering process scheduler 318 of FIG. 3 in accordance with an embodiment. Servers 414A-B may be servers 314A-B of FIG. 3 in accordance with an embodiment. Device 552 may be one of devices 452A-C of FIG. 4 in accordance with an embodiment.

In several embodiments, device 552 may be client device 902 of FIG. 9, and may include personal computers, cellular or other mobile phones, handheld messaging devices, laptop computers, tablet computers, set-top boxes, personal data assistants, embedded computer systems, electronic book readers, and the like. Device 552 is configured to communicate with network 512. Within the device 552, client applications 508A-B and host application 502 are provisioned. In one embodiment, host application 502 communicates with server 514A or server 514B through network 512 and obtains one or more image resources to generate content (e.g., drawing instructions, image resources) for content areas 510A-B. In this embodiment, client application 508A is a program running on the foreground, and application 508B is a program running in the background.

As illustrated above, the host application 502 obtains the operational states (e.g., foreground, background) of the client applications 508A-B and schedules the rendering processes 516A-B based on these operational states. For example, rendering process scheduler 518 determines a schedule in which host process 504 may initiate the rendering process 516A which corresponds to content area 510A of the client application 508A first because its operational state indicates that the client application 508A is running on the foreground status. Conversely, rendering process 516B is scheduled by the host application 502 to be executed later because the client application 508 is running on background.

Figure 6A:
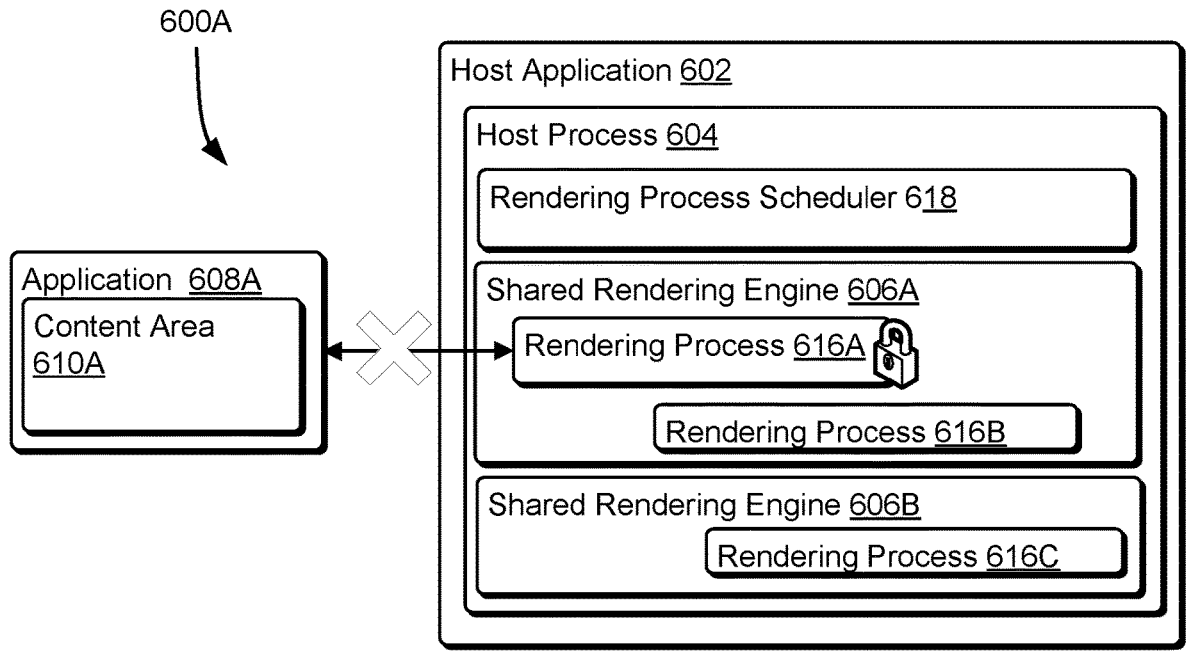
FIG. 6A and FIG. 6B illustrate example configurations of rendering remote web content that maintains web content state in accordance with an embodiment.
Figure 6B:
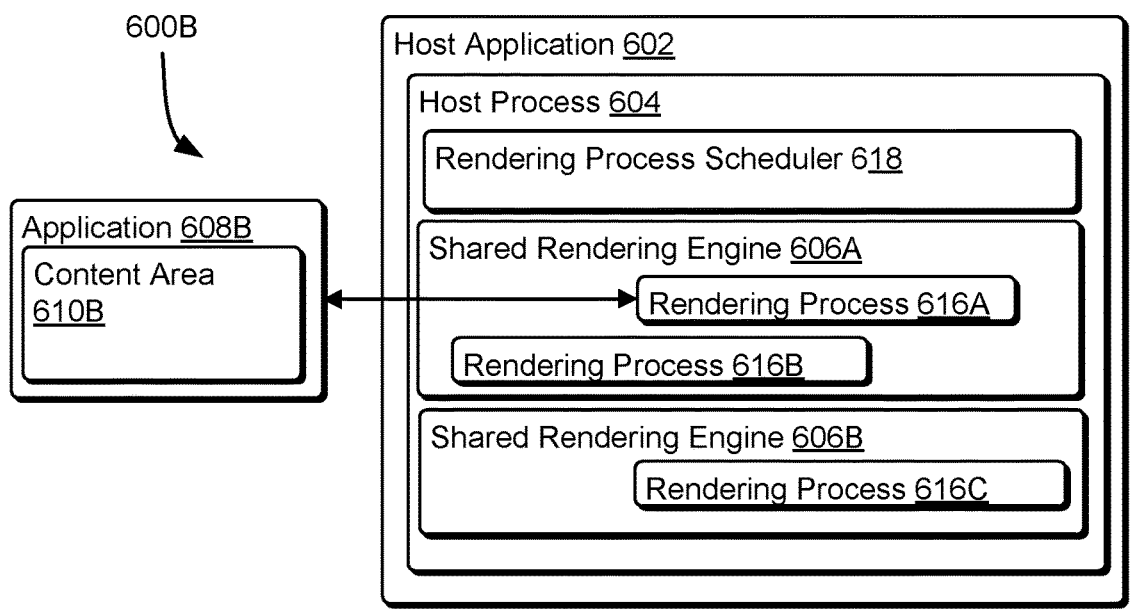

FIG. 6A and FIG. 6B illustrate example configurations 600A and 600B of rendering remote web content that maintains web content state in accordance with an embodiment. Host application 602 may be host application 302 of FIG. 3 in accordance with an embodiment. Host process 604 may be host process 304 of FIG. 3 in accordance with an embodiment. Shared rendering engines 606A-B may be shared rendering engines 306A-B of FIG. 3 in accordance with an embodiment. Rendering processes 616A-B may be shared rendering processes 316A-B of FIG. 3 in accordance with an embodiment. Client applications 608A-B may be client applications 308A-B of FIG. 3 in accordance with an embodiment. Content areas 610A-B may be content areas 610A-B of FIG. 3 in accordance with an embodiment.

In several embodiments, the host application 602 may terminate an inter-process communication with any client application. In some embodiments, the host application 602 or the client application 608 may terminate the communication because the remote web content rendering is completed. In other embodiments, the host application 602 or client application 608 may terminate the inter-process communication based on determining that the time duration for completing the rendering process 616 exceeds a predetermined threshold value. In yet other embodiments, the host application 602 may terminate the inter-process communication based on determining that the rendering process 616 is unresponsive. In several embodiments, variations of terminating inter-process channels are available and may become apparent to those of ordinary skill in the art upon reading the foregoing description.

In one embodiment, the host application 602 may permit the rendering processes 616A-C to be maintained while the inter-process communication is temporarily disconnected. Referring to FIG. 6A, the host process 604 may detach the inter-process communication channel after the client application 608 obtains a reconnection token (or interchangeable referred to as "handle") from the host process 604. In several embodiments, the reconnection token may be issued to client application 608 in response to local and network events occurring in the application 608. The events may include allowing the client application to perform offline operations, including upgrade itself, temporarily terminate itself to conserve resources, or restart itself with different user interface. In one embodiment, reconnection token may be a token for reestablishing inter-process channel between rendering processes 616A-C and client applications 608A-B in the event of an interrupted communications sessions. In several embodiments, reconnection token may be requested by the client application 608 and may include client request ID, server command ID, interruption time stamp if used, a host application identifier. In several embodiments, reconnection token uniquely identifies the command to be performed by the host process 604 and performs one or more operations to restore the connections. In several embodiments, the host process 604 will sustain the state or optionally marshal the state to persistent storage. In one embodiment, the host process 604 may suspend the rendering process 616 or place the rendering process 616 in lower priority in the queue if the corresponding client application temporarily disconnects using the reconnection token. For example, client application 608A may perform an offline upgrade though not requiring an update to its graphical user interface. In this case, client application 608A may obtain a reconnection token corresponding to rendering process 616A. As a result of client application 608A obtaining the reconnection token, the host process 604 may terminate the inter-process communication, but maintain the configuration data, session information, and other computing resources of the rendering process 616A. However, the rendering process scheduler 618 may suspend the rendering process 616A until the client application 608A reestablishes the inter-process communication channel.

In one embodiment, rendering processes 616A-C may be cryptographically protected from access by other applications or processes when the client application temporarily disconnects from the corresponding inter-process communication. In one embodiment, one or more cryptographic modules of the host application 602 may perform cryptographic operations to encrypt the rendering process once the client application requests the process to be temporarily suspended. As a result of the encryption, the host application 602 may obtain a cryptographic key which may be the reconnection token to be provided to the client application 608A. In this manner, only the client application 608A can decrypt the corresponding encrypted rendering process 616A and allow the host process 604 to provide the rendered content for the content area 610A of the client application 608A.

In several embodiments, The cryptographic module of the host application 602, which may be a trusted platform module (TPM), may include a memory subsystem, including a main random access memory (RAM) for storage of instructions and data during program execution and a read only memory (ROM), in which fixed cryptographic information may be stored, such as a hardware secret stored securely within the device of the computer resource service provider 212 so as to be non-exportable (i.e., inaccessible through any call to the cryptographic module). The cryptographic module, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. Cryptographic keys may be stored in RAM and/or processor registers for temporary cryptographic processing. Cryptographic module may use the cryptographic information stored in memory in combination with cryptographic information obtained from one or more devices by connecting through the network. Cryptographic module may include one or more cryptographic processors which may be used by cryptographic module to perform cryptographic operations for the computer resource service provider 212 and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module may collectively perform various operations used to generate cryptographically verifiable information for requests generated by host application 602 to ensure that the rendering process is not accessed by other processes at least until the client application (e.g., client application 608A) reestablishes the inter-process communication.

Referring to FIG. 6B, the client application 608 can reconnect with rendering process 616 of host application 602 to access the existing web content, in which the client application 608 uses the reconnection token. In this manner, the client application 608 does not require losing user state such as form input, dynamically loaded content, and session cookies. In one embodiment, the client application 608B reconnecting with the rendering process 608A may be the same application but different version of the client application 608A that disconnected from the rendering process 608B. In other embodiments, the client application 608B may be exactly same as the client application 608A. In yet other embodiments, the client application 608B can be a completely different application from client application 608A. In this example, client application 608B, by using the previously obtained reconnection token, reestablishes inter-process connection with the rendering process 616 of the host application 602. As illustrated above, the client application 608B use the reconnection token to decrypt the encrypted rendering process 616A. In response, the rendering process 616 may resume its operations to generate the web content for the content area 610B on behalf of the application 608B. However, because the rendering process 616A was suspended during the disconnection, the host process has updated the rendering schedule after rendering process 616B.

Figure 7:
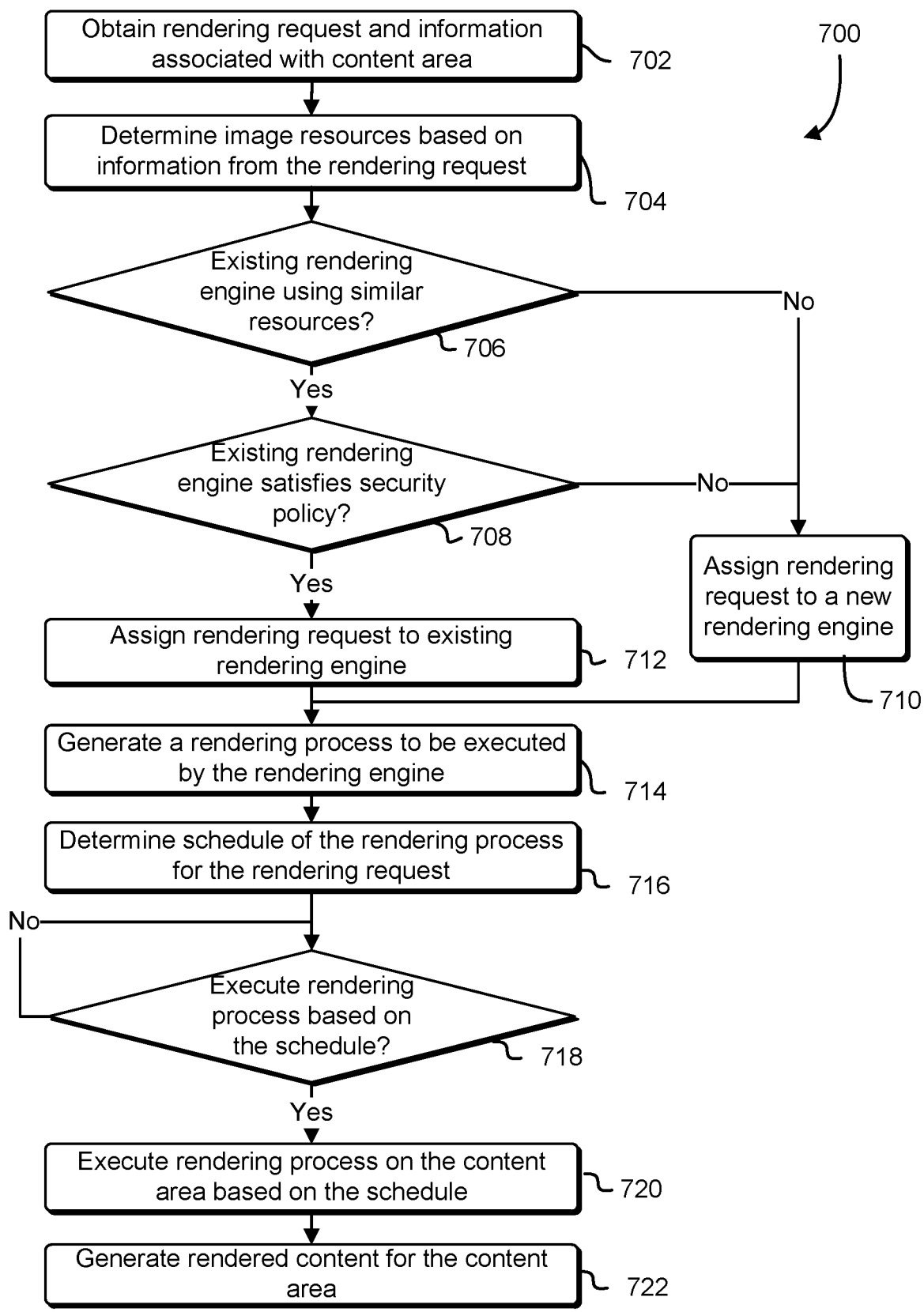
FIG. 7 illustrates a flowchart for inter-process rendering pipeline for shared process remote web content rendering in accordance with an embodiment.

FIG. 7 illustrates a flowchart for inter-process rendering pipeline for shared process remote web content rendering in accordance with an embodiment. The process 700 is initiated by the host application (e.g., host application 302 of FIG. 3) obtaining rendering request and information associated with the content area from a client application, such as client application 308A of FIG. 3 (step 702). Once the rendering request is received, the host application determines types of image resources based on information from the rendering request (step 704). In some embodiments, the host application determines types of image resources based on the rendering context indicated in the request. At step 706, the host application determines whether there is an existing rendering engine that uses similar types of image resources.

If it is determined that the existing rendering engine does not exist ("No" path of step 706), the host application assigns the rendering request to a new rendering engine (step 710). If it is determined that the existing rendering engine does exist ("Yes" path of step 706), the host application further determines whether such existing rendering engine satisfies the security policy required in the request (step 708). In several embodiments, the request for rendering remote content may include security policy information indicating whether one or more image resources to generate the rendered content can be shared with other rendering processes. If sharing the rendering engine violates the security policy information ("No" path of step 708), the host application assigns the rendering request to a new rendering engine (step 710).

If the existing shared rendering engine satisfies the security information indicated in the request ("Yes" path of step 708), the host application assigns the rendering request to the existing rendering engine (step 712). In one embodiment, the host application allows a subset of image resources to be shared by rendering processes within the same rendering engine which result in decrease of processing costs and memory resource access requests. At step 714, after the shared rendering is assigned, the host application generates a rendering process corresponding to the request to be executed by the host process. In several embodiments, the rendering process includes creating a plurality of worker threads that accesses image resources and rasterize web content on the content area. The host application also determines the schedule for the rendering process of the request (step 716). As illustrated above, the host application may use the rendering process scheduler (e.g., rendering process scheduler 318 of FIG. 3) to determine the order and timing of the rendering process being executed by the host process. For example, rendering process scheduler may obtain operational state of the application that submitted the request to determine whether the rendering process should be prioritized.

After the schedule is determined, the host process of the host application begins the rendering process by querying the rendering process scheduler whether it can execute the rendering process (step 718). If it is determined that, based on the response from the rendering process scheduler, the rendering process should not be executed ("No" path of step 718), the host process returns to the loop and performs step 718 again at another time. Once it is determined that the rendering process can be executed based on the schedule ("Yes" path of step 718), the host application executes the rendering process on the content area based on the schedule (step 720). As illustrated above herein, the rendering process includes generating one or more drawing instructions to allow the rendering engine to generate web content. Once the rendering process is completed, the host application generates the rendered web content for the content area of the client application, which may display the content for its user (step 722). In one embodiment, the host application may permit its rendering process to be access by the client application so that the client application may display the generated content. Process 700 terminates thereafter.

Figure 8:
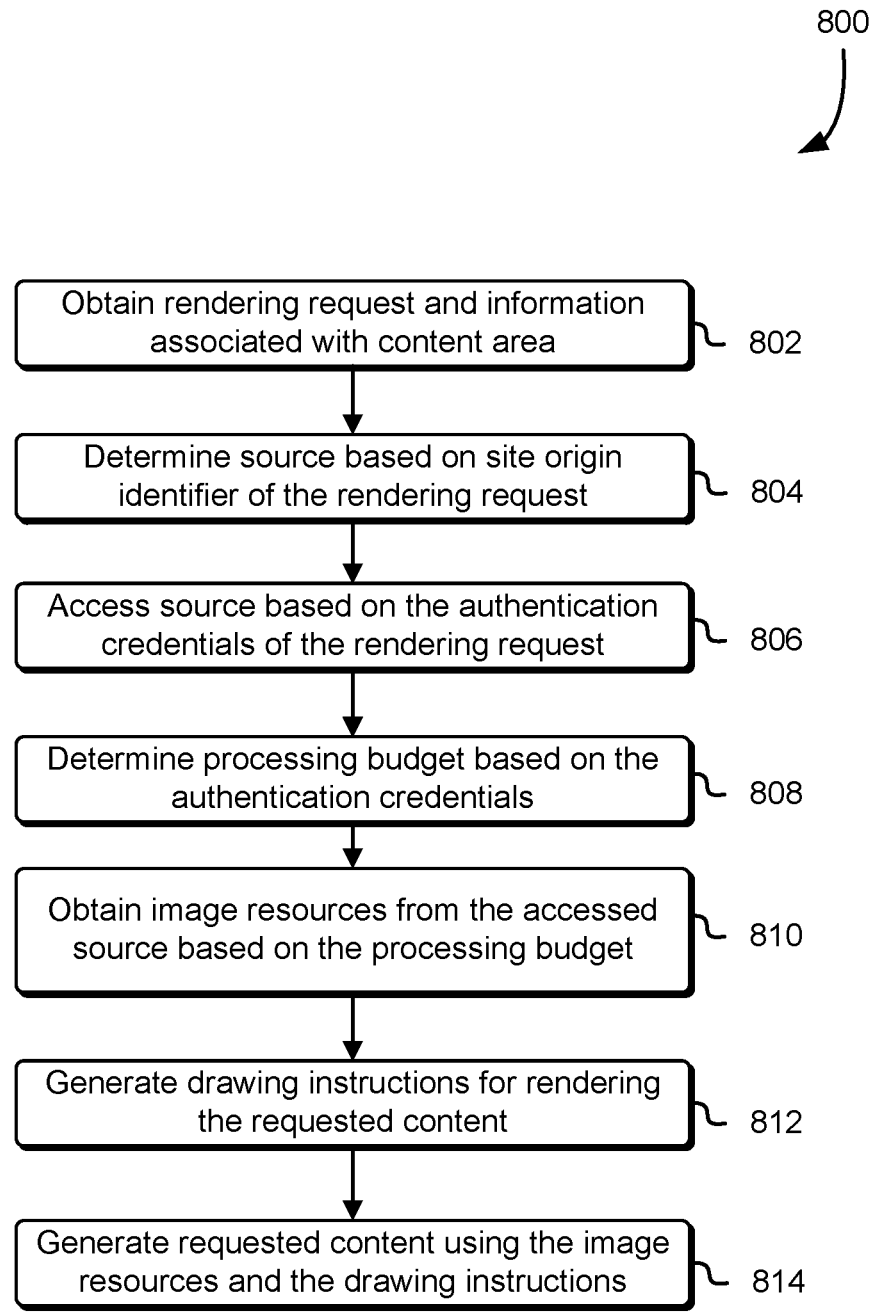
FIG. 8 illustrates a flowchart for determining schedule of processing remote web content rendering in accordance with an embodiment.

FIG. 8 illustrates a flowchart for determining schedule of processing remote web content rendering in accordance with an embodiment. Process 800 is initiated by the host application obtaining rendering request and information associated with content area (step 802). In one embodiment, the information associated with content area may include screen size, screen resolution, clipped region, and the like. The host application determines source of the image resources based on site origin identifier indicated in the rendering request (step 804). In several embodiments, source of the image resources may be a data store (such as data store 910 of FIG. 9), one or more servers (such as servers 314A-B of FIG. 3) which may include an application server (such as an application server 908 of FIG. 9).

At step 806, the host application accesses source based on the authentication credentials of the rendering request. As illustrated above, the authentication credentials include impersonation credentials which grant the host application similar privileges as the client application when accessing the image resources to generate web content for the content area. Additionally, the host application determines processing budget based on the authentication credentials of the request (step 808). The host application obtains one or more image resources from the accessed source (such as data store 910 of FIG. 9) based on the processing budget (step 810). In some embodiments, the processing budget may cause the host application to unselect one or more image resources, including any scripts that may cause the processing cost to exceed the budget. After one or more image resources are obtained, the host application also generates one or more drawing instructions for rendering the requested content (step 812). Using the image resources and the drawing instructions, the host application generates the rendered content for the content area of the client application (step 814). In alternative embodiments, the host application provides the image resources and the drawing instructions to the client application so that the client application may generate the content in its corresponding content area. Process 800 terminates thereafter.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more processors; and
   memory that stores computer-executable instructions that, if executed, cause the one or more processors to:
   render first web content for a host application of a computing device;
   obtain a request from a first client application of the computing device to render second web content, the request including a content area and transmitted through a communication channel established between the first client application and the host application;
   determine to provide a rendering of the second web content based at least in part on security policy information associated with the request, the security policy information indicating that the second web content can be shared with the first client;
   determine a schedule for processing the request based at least in part on operational state of the first client application;
   render, in accordance with the determined schedule, the second web content in the content area; and
   provide access to the first client application to display the rendered second web content in the content area.

2. The system of claim 1, wherein the instructions further comprise instructions that, if executed, cause the one or more processors to:
   identify authenticated credentials provided in the request; and
   obtain a set of image resources from a computer resource service provider by using the authenticated credentials.

3. The system of claim 2, wherein the first client application provides an interface call to the host application through the communications channel, the interface call includes the request, and the request further including a resource identifier that identifies the computer resource service provider.

4. The system of claim 1, wherein the instructions further comprise instructions that, if executed, cause the one or more processors to:
   receive another request from a second client application to render third web content; and
   update the schedule of all existing processes to render web content to render the third web content before rendering the second web content, the updated schedule determined based at least in part on operational state of the second client application.

5. The system of claim 1, wherein the content area includes a content region into which the content rendering engine renders the second web content.

6. The system of claim 1, wherein programming libraries to generate the second web content are stored in the host application only.

7. A method comprising:
   obtaining an image rendering request through a communication channel established by an application, the image rendering request including a content area;
   selecting a content rendering engine based on one or more image resources required to generate web content and security policy information as specified in the image rendering request;
   determining the one or more image resources corresponding to the image rendering request by using the content rendering engine; and
   generating the web content on the content area on behalf of the application, the web content generated based at least in part on the one or more image resources.

8. The method of claim 7, further comprising:
   determining, by an operating system, a time duration at which the determination of the one or more image resources will be processed; and
   as a result of the time duration exceeding a threshold value, postponing the determination of one or more image resources corresponding to the image rendering request until other image rendering requests are completed.

9. The method of claim 7, further comprising obtaining additional image rendering requests from other applications, each of the other applications permitted to establish corresponding communication channels.

10. The method of claim 9, further comprising allocating a shared memory resource to process the image rendering request and the additional image rendering requests.

11. The method of claim 7, further comprising:
obtaining, from an operating system, information that the application is being executed on a background process; and
postponing the determination of the image resources based on the information obtained from the operating system.

12. The method of claim 7, further comprising:
obtaining, from an operating system, information that the application is being executed on a foreground process; and
prioritizing the determination of the image resources based on the information obtained from the operating system.

13. The method of claim 7, further comprising generating one or more rendering processes for the image rendering request, one or more rendering processes including authentication credentials and an identifier indicating the application.

14. The method of claim 13, wherein the one or more image resources are selected from a group consisting of: fonts; cached images; image decoder binary libraries; and rasterized content.

15. The method of claim 14, further comprising:
determining that at least two rendering processes include compatible authentication credentials; and
permitting the two rendering processes to share the one or more image resources.

16. A non-transitory computer-readable storage medium comprising executable instructions that, as a result of being executed by one or more processors of a computer system, cause the computer system to at least:
establish a communication channel with a content rendering engine of a host application;
provide, through the communication channel, a request comprising a virtual screen to the content rendering engine, the content rendering engine of the host application usable to render web content on the virtual screen, the content provided based, at least in part, on a determination that authentication credentials associated with the request indicate that the host process is authorized to generate content on behalf of a computing device;
obtain the rendered virtual screen from the content rendering engine through another separate communication channel; and
cause the web content to be displayed on a screen of the computing device.

17. The non-transitory computer-readable storage medium of claim 16, wherein the instructions further comprise instructions that, as a result of being executed by the one or more processors, cause the computer system to provide authorization credentials to the content rendering engine to permit the content rendering engine to obtain one or more image resources on behalf of the computer system.

18. The non-transitory computer-readable storage medium claim 16, wherein the instructions further comprise instructions that, as a result of being executed by the one or more processors, cause the computer system to provide authorization credentials to the content rendering engine, the authentication credentials comprising a processor budget, the content rendering engine selecting a subset of image resources based at least in part on the processor budget.

19. The non-transitory computer-readable storage medium of claim 16, wherein the instructions further comprise instructions that, as a result of being executed by the one or more processors, cause the computer system to:
obtain a reconnection token associated with the virtual screen and resources used to generate the virtual screen from the content rendering engine, the content rendering engine storing the rendered virtual screen in persistent storage and suspending process of rendering the virtual screen in response to providing the reconnection token; and
in response to obtaining the reconnection token, detach the communication channel with the content rendering engine.

20. The non-transitory computer-readable storage medium of claim 19, wherein the instructions further comprise instructions that, as a result of being executed by the one or more processors, cause the computer system to:
use the reconnection token to reestablish the communication channel with the content rendering engine; and
obtain the rendered virtual screen from the content rendering engine without submitting another request.

* * * * *